United States Patent [19]

Strack

[11] 4,339,419

[45] * Jul. 13, 1982

[54] PROCESS FOR THE PRODUCTION OF CRYSTALLINE ZEOLITE POWDER OF TYPE A

[75] Inventor: Hans Strack, Alzenau, Fed. Rep. of Germany

[73] Assignees: Degussa AG, Frankfurt; Henkel Kommanditgesellshaft auf Aktien (Henkel KGaA), Duesseldorf, both of Fed. Rep. of Germany

[*] Notice: The portion of the term of this patent subsequent to Jul. 13, 1999, has been disclaimed.

[21] Appl. No.: 237,730

[22] Filed: Feb. 24, 1981

[30] Foreign Application Priority Data

Feb. 25, 1980 [DE] Fed. Rep. of Germany ....... 3007080

[51] Int. Cl.$^3$ .............................................. C01B 33/28
[52] U.S. Cl. ..................................... 423/329; 423/328
[58] Field of Search ............................... 423/328–330; 252/455 Z; 106/228 B

[56] References Cited

U.S. PATENT DOCUMENTS

| | | | |
|---|---|---|---|
| 4,041,135 | 8/1977 | Williams et al. | 423/328 |
| 4,071,377 | 1/1978 | Schwuger et al. | 423/329 |
| 4,073,867 | 2/1978 | Roebke et al. | 423/329 |
| 4,248,847 | 2/1981 | Derleth et al. | 423/329 |
| 4,303,626 | 12/1981 | Strack et al. | 423/329 |
| 4,303,627 | 12/1981 | Strack et al. | 423/329 |
| 4,303,628 | 12/1981 | Strack et al. | 423/329 |
| 4,305,916 | 12/1981 | Strack et al. | 423/329 |

FOREIGN PATENT DOCUMENTS 2651437  5/1978  Fed. Rep. of Germany ...... 423/328

*Primary Examiner*—Edward J. Meros
*Attorney, Agent, or Firm*—Cushman, Darby & Cushman

[57] ABSTRACT

There is produced a crystalline zeolite powder of Type A which can be employed as a phosphate substitute in washing agents by a precipitation reaction by a specific sequence in which there are simultaneously added to water in a container a waterglass solution and a sodium aluminate liquor and subsequently in succession a waterglass solution and then sodium aluminate liquor. The crystalline product has an average particle size of 6.7 to 8$\mu$ as well as a narrow particle size distribution curve.

5 Claims, No Drawings

PROCESS FOR THE PRODUCTION OF CRYSTALLINE ZEOLITE POWDER OF TYPE A

BACKGROUND OF THE INVENTION

The invention is directed to a process for the production of crystalline zeolite powder of Type A.

Zeolite A is a crystalline alkali aluminum silicate and corresponds in its composition to the formula $$1.0 \pm 0.2\ M_{2/n}O : Al_2O_3 : 1.85 \pm 0.5\ SiO_2 \cdot y\ H_2O$$

where M is a metal cation, n its valence and y has a value up to 6.

Zeolite A in an increasing measure is important as a substitute for phosphate in washing agents. For this purpose, it is desirable that the crystalline zeolite powder of Type A have the most uniform particle size possible, i.e. as narrow as possible particle size distribution curve.

SUMMARY OF THE INVENTION

The object of the invention is the development of a process for the production of crystalline zeolite powder of Type A having an average particle size diameter of 6.7 to 8μ which is characterized by simultaneously adding to a receiver containing 8 to 12 parts by volume of water during a time span of 5 to 15 minutes with stirring at a temperature of 30° to 70° C. 2 to 8 parts by volume of sodium aluminate liquor having a concentration of 50 to 200, preferably 90 to 150 g/l of Na$_2$O and 30 to 150, preferably 100 to 110 g/l of Al$_2$O$_3$ as well as 0.6 to 1.2 parts by volume of a waterglass solution having a concentration of 90 to 120, preferably 100 to 110 g/l of Na$_2$O and 330 to 380, preferably 340 to 370 g/l of SiO$_2$, which in a given case can be diluted with 1.0 to 1.5 parts by volume of water, stirring for a time span of 10 to 40 minutes, subsequently adding at a temperature of 30° to 70° C. during a time span of 5 to 15 minutes a further 2 to 3 parts by volume of waterglass solution of the same concentration, stirring for a time span of 10 to 40 minutes at a temperature of 30° to 70° C., subsequently adding with stirring at a temperature of 30° to 70° C. a further 16 to 20 parts by volume of a sodium aluminate liquor of the same concentration during a time span of 5 to 15 minutes further stirring at a temperature of 75° to 100° C. for a time span of 20 to 180 minutes, cooling and filtering off the crystalline product and drying.

The crystalline zeolite powder of Type A obtained according to the process of the invention has an average grit portion (particle above 45μ) of <0.025%. It can be employed advantageously as a phosphate substitute in washing agents.

The process can comprise, consist essentially of or consist of the steps set forth with the stated materials.

The process of the invention is explained in the following examples.

DETAILED DESCRIPTION

Example 1

There were present in a reaction vessel 10 liters of water. Subsequently there were simultaneously added during a time span of 10 minutes at a temperature of 35° C. with stirring 2 liters of sodium aluminate liquor having a concentration of 135 g/l of Na$_2$O and 78 g/l of Al$_2$O$_3$ and 1.2 liters of waterglass solution having a concentration of 100 g/l of Na$_2$O and 349 g/l of SiO$_2$ and stirring continued subsequently for 30 minutes. Then there were added a further 2.4 liters of waterglass solution of the same concentration during a time span of 10 minutes at a temperature of 35° C. Then stirring was carried out for a further 30 minutes and subsequently there were added under stirring, during 10 minutes, at a temperature of 35° C., a further 18 liters of sodium aluminate liquor of the same concentration. The reaction mixture was stirred for a further 50 minutes at 98° C. and cooled.

The crystalline reaction product was filtered off and dried.

The particle size distribution curve was determined with a Coulter Counter. There were obtained the following values

| | |
|---|---|
| 50% | <8.0μ |
| 17% | <10μ |
| 4% | <15μ |

The grit content (particles >45μ) was 0.024% according to Mocker. (The percentages in the examples are by weight.) The calcium binding capacity was 148 mg CaO/g of zeolite.

EXAMPLE 2

There were present in a reaction vessel 10 liters of water. Subsequently there were simultaneously added during a time span of 10 minutes at a temperature of 48° C. with stirring 2 liters of sodium aluminate liquor having a concentration of 145 g/l of Na$_2$O and 81 g/l of Al$_2$O$_3$ and 0.6 liters of waterglass solution having a concentration of 100 g/l of Na$_2$O and 349 g/l of SiO$_2$, which is diluted with 1.4 liters of water. Subsequently stirring was carried out for 30 minutes. Then there were added a further 3.0 liters of waterglass solution of the same concentration during a time span of 10 minutes at a temperature of 48° C. The stirring was carried out for a further 30 minutes. Then there were added 3.0 liters of waterglass solution of the same concentration during 10 minutes at a temperature of 48° C. Then stirring was continued for 30 minutes and subsequently there were added under stirring at a temperature of 48° C. a further 18 liters of sodium aluminate liquor of the same concentration during 10 minutes. The reaction mixture was stirred for a further 80 minutes at a temperature of 88° C. and cooled.

The crystalline reaction product was filtered off and dried.

The particle size distribution curve was determined by means of a Coulter Counter. There were obtained the following values:

| | |
|---|---|
| <50% | 6.7μ |
| <12% | 10μ |
| < 4% | 15μ |

The grit content (particles >45μ) was 0.018% according to Mocker and the calcium binding capacity was 151/mg CaO/g of zeolite.

The entire disclosure of German priority application No. P 3007080.5 is hereby incorporated by reference.

What is claimed is:

1. A process for the production of a crystalline zeolite powder of Type A having an average particle diameter of 6.7 to 8.0μ comprising (1) having present in a container 8 to 12 parts by volume of water, (2) simultaneously adding with stirring during a time span of 5 to 15 minutes at a temperature of 30° to 70° C. either (a) 2 to 8 parts by volume of sodium aluminate liquor having a concentration of 50 to 200 g/l of $Na_2O$ and 30 to 100 g/l of $Al_2O_3$ and 0.6 to 1.2 parts by volume of a waterglass solution having a concentration of 90 to 120 g/l of $Na_2O$ and 330 to 380 g/l or (b) a sodium aluminate liquor and waterglass solution as set forth in (a) wherein the waterglass solution is diluted with water in an amount up to 1.5 times its volume (3) stirring for a time span of 10 to 40 at 30° to 70° C. minutes, (4) subsequently adding during a time span of 5 to 15 minutes a further 2 to 3 parts by volume of waterglass solution of the same concentration as in step (2), (5) stirring for a time span of 10 to 40 minutes at a temperature of 30° to 70° C., (6) subsequently with stirring at a temperature of 30° to 70° C. during a time span of 5 to 15 minutes adding a futher 16 to 20 parts by volume of a sodium aluminate liquor of the same concentration as in step (2), (7) subsequently stirring the reaction mixture over a time span of 20 to 180 minutes at a temperature of 75° to 100° C. and filtering off the crystalline product and drying.

2. The process of claim 1 wherein in step (2) there is employed the waterglass solution diluted with 1.0 to 1.5 times its volume of water.

3. The process of claim 1 wherein the concentration of the sodium aluminate liquor added in step (2) is 90 to 150 g/l of $Na_2O$ and 100 to 110 g/l of $Al_2O_3$ and the concentration of the waterglass solution in step (2) is 100 to 110 g/l of $Na_2O$ and 340 to 370 g/l of $SiO_2$ or such waterglass solution diluted with 1.0 to 1.5 times its volume of water.

4. The process according to claim 1 wherein the there is originally present in the container 10 liters of water, step (2) is carried out during 10 minutes at a temperature of 35° C. using 2 liters of sodium aluminate liquor having a concentration of 135 g/l of $Na_2O$ and 78 g/l of $Al_2O_3$ and 1.2 liters of waterglass solution having a concentration of 100 g/l of $Na_2O$ and 349 g/l of $SiO_2$, stirring in step (3) is for 30 minutes, in step (4) there is added 2.4 liters of the waterglass solution during 10 minutes at a temperature of 35° C. stirring in step (5) is for 30 minutes, in step (6) there is added 18 liters of the sodium aluminate liquor at a temperature of 35° C. during 10 minutes and in step (7) stirring is for 50 minutes at 98° C.

5. The process according to claim 1 wherein there is originally present in the container 10 liters of water, step (2) is carried out during 10 minutes at a temperature of 48° C. using 2 liters of sodium aluminate liquor having a concentration of 145 g/l of $Na_2O$ and 81 g/l of $Al_2O_3$ and 0.6 liter of waterglass solution having a concentration of 100 g/l of $Na_2O$ and 349 g/l of $SiO_2$ which is diluted with 1.4 liters of water, stirring in step (3) is for 30 minutes, in step (4) there is added 3.0 liters of the waterglass solution during 10 minutes at 48° C., stirring in step (5) is for 30 minutes, in step (6) there is added 18 liters of the sodium aluminate liquor at a temperature of 48° C. during 10 minutes and in step (7) stirring is for 80 minutes at 88° C.

* * * * *